United States Patent
Kimmel

(10) Patent No.: US 7,828,515 B1
(45) Date of Patent: Nov. 9, 2010

(54) MULTIPLE PIECE TURBINE AIRFOIL

(75) Inventor: Keith D Kimmel, Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 51 days.

(21) Appl. No.: 12/468,349

(22) Filed: May 19, 2009

(51) Int. Cl.
*F01D 9/06* (2006.01)
*F01D 5/18* (2006.01)

(52) U.S. Cl. .................. 415/115; 415/116; 415/136; 415/138; 416/96 A; 416/97 R; 416/226

(58) Field of Classification Search ............ 415/115, 415/116, 134, 136, 138; 416/96 R, 96 A, 416/97 R, 226
See application file for complete search history.

(56) References Cited

U.S. PATENT DOCUMENTS

| 3,644,060 | A  | * | 2/1972  | Bryan .................. 416/97 R |
| 4,573,872 | A  | * | 3/1986  | Nakata ................ 416/96 A  |
| 4,786,234 | A  | * | 11/1988 | Readnour ............. 416/97 R |
| 6,120,244 | A  | * | 9/2000  | Fukura ................ 415/115  |
| 6,224,339 | B1 | * | 5/2001  | Rhodes et al. ........ 416/224  |
| 7,080,971 | B2 | * | 7/2006  | Wilson et al. ......... 416/92   |
| 7,247,002 | B2 | * | 7/2007  | Albrecht et al. ...... 416/224  |

* cited by examiner

*Primary Examiner*—Christopher Verdier
(74) *Attorney, Agent, or Firm*—John Ryznic

(57) ABSTRACT

A turbine airfoil, such as a rotor blade or a stator vane, for a gas turbine engine, the airfoil formed as a shell and spar construction with a plurality of hook shaped struts each mounted within channels extending in a spanwise direction of the spar and the shell to allow for relative motion between the spar and shell in the airfoil chordwise direction while also fanning a seal between adjacent cooling channels. The struts provide the seal as well as prevent bulging of the shell from the spar due to the cooling air pressure. The hook struts have a hooked shaped end and a rounded shaped end in order to insert the struts into the spar.

10 Claims, 1 Drawing Sheet

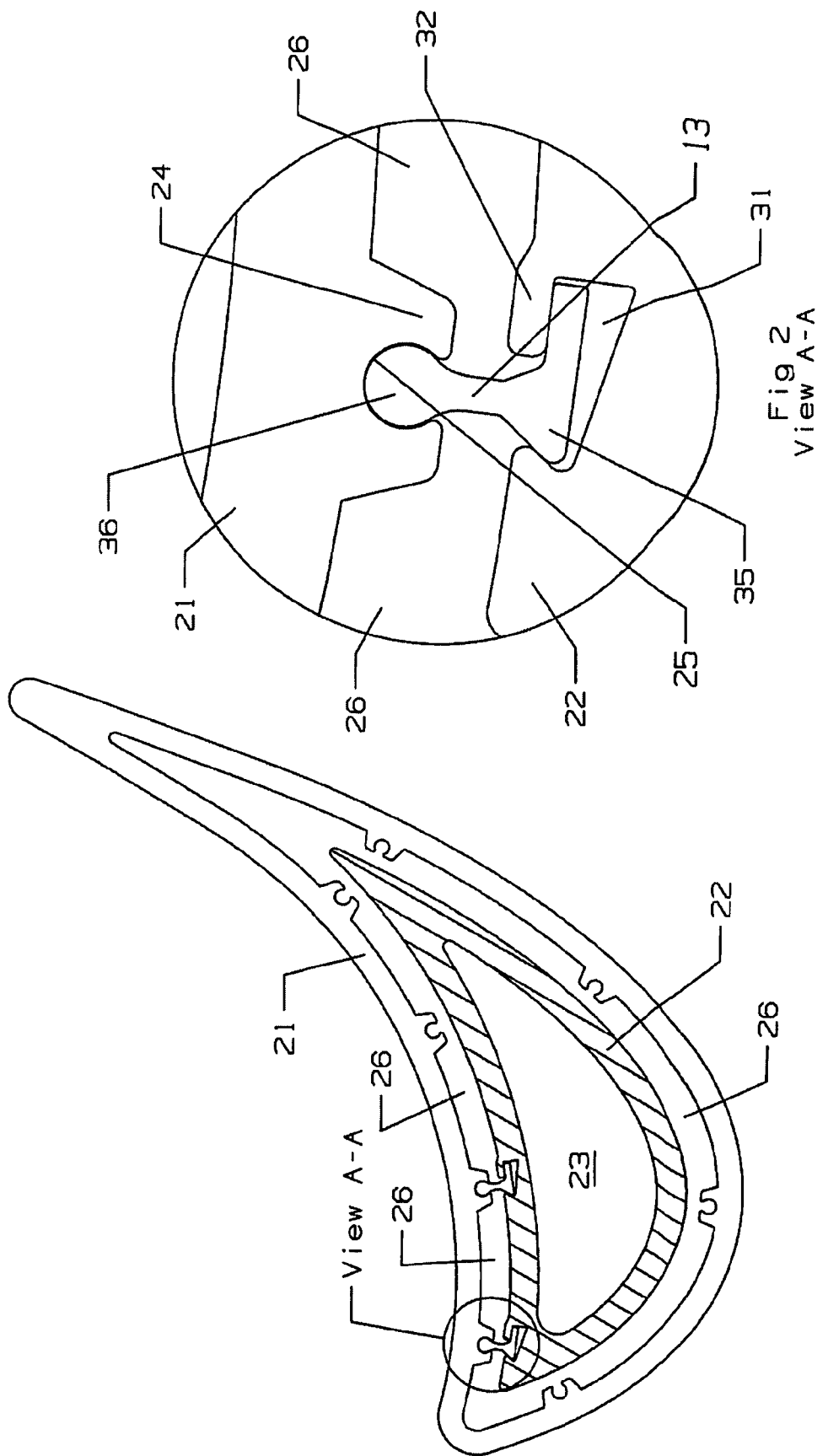

MULTIPLE PIECE TURBINE AIRFOIL

GOVERNMENT LICENSE RIGHTS

This invention was made with Government support under contract number DE-FG02-07ER84668 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine airfoil with a spar and shell construction.

2. Description of the Related Art Including Information Disclosed Under 37 CFR 1.97 and 1.98

A gas turbine engine, such as an industrial gas turbine (IGT) engine, compresses air that is then burned with a fuel to produce a high temperature gas flow, which is then passed through a turbine having multiple rows or stages or stator vanes and rotor blades to power an aircraft or, in the case of the IGT, drive an electric generator. It is well known in the art of gas turbine engine design that the efficiency of the engine can be increased by passing a higher gas flow temperature through the turbine. However, the turbine inlet temperature is limited by the material properties of the turbine, especially for the first stage airfoils since these are exposed to the highest temperature gas flow. As the gas flow passes through the various stages of the turbine, the temperature decreases as the energy is extracted by the rotor blades.

Another method of increasing the turbine inlet temperature is to provide more effective cooling of the airfoils. Complex internal and external cooling circuits or designs have been proposed using a combination of internal convection and impingement cooling along with external film cooling to transfer heat away from the metal and form a layer of protective air to limit thermal heat transfer to the metal airfoil surface. However, since the pressurized air used for the airfoil cooling is bled off from the compressor, this bled off air decreases the efficiency of the engine because the work required to compress the air is not used for power production. It is therefore wasted energy as far as producing useful work in the turbine.

Recently, airfoil designers have proposed a new air cooled turbine rotor blade or stator vane design that is referred to as a spar and shell airfoil. U.S. Pat. No. 7,080,971 issued to Wilson et al. on Jul. 25, 2006 and entitled COOLED TURBINE SPAR SHELL BLADE CONSTRUCTION discloses one of these latest airfoils, the entire disclosure being incorporated herein by reference. The spar and shell construction allows for the use of a shell that can be made from an exotic high temperature alloy or material such as tungsten, molybdenum or columbium that could not be used in the prior art investment casting blades or vanes. Airfoils made from the investment casting technique are formed from nickel super-alloys and as a single piece with the internal cooling circuitry cast into the airfoil. Film cooling holes are then drilled after the airfoil has been cast. Without much improvement in the cooling circuitry of these investment cast nickel super-alloy airfoils, the operating temperature is about at its upper limit.

Thus, these new spar and shell airfoils will allow for the shell to be formed from the exotic high temperature materials because the shell can be formed using a wire EDM process to form a thin wall shell, and then the shell is supported by a spar to form the blade or vane. The exotic high temperature metals such as tungsten, molybdenum or columbium cannot be cast using the investment casting process because of their very high melting temperatures. However, thin walled shells can be formed using the wire EDM process. With a spar and shell airfoil having a shell made from one of these materials, the operating temperature can be increased way beyond the maximum temperature for an investment cast airfoil. Thus, the engine turbine inlet temperature can be increased and the engine efficiency increased.

One major problem with these new spar and shell airfoils that the applicants have discovered is that the shell and the spar have high thermal stress loads formed due to the large temperature differences. The shell is exposed to the high temperature gas flow while the spar, which can be made from the investment cast materials, is cooled with cooling air so that the temperature is much lower than the shell. If the shell is rigidly secured to the spar, the temperature difference will produce high thermal stress loads on ribs that connect the shell to the spar. A number of ribs are required to hold the thin shell wall to the spar when a high cooling air pressure is formed between the shell and the spar that tends to push the shell wall away from the spar. Thus, the ribs are used to hold the thin shell wall to the spar so that high pressure cooling air can be used between these two surfaces. If the ribs are rigidly fixed to the spar and the shell, then the high thermal stress loads will produce cracks in the ribs. U.S. Pat. No. 7,247,002 issued to Albrecht et al. on Jul. 24, 2007 and entitled LAMELLATE CMC STRUCTURE WITH INTERLOCK TO METALLIC SUPPORT STRUCTURE shows a composite turbine component with a ceramic shell secured to a metallic spar in which individual lamellae are supported directly by the support structure via cooperating interlock features formed on the lamella and on the support structure respectively. Mating load-transferring surfaces of the interlock features are disposed in a plane oblique to local axes of thermal growth in order to accommodate differential thermal expansion there between with delta alpha zero expansion. This design will allow for differential thermal growths along the airfoil spanwise (radial) direction parallel to the interlocking features, but not in a direction perpendicular to this such as along a direction parallel to the chordwise direction (the line from the leading edge to the trailing edge through the center of the airfoil cross section in the plane of FIG. 1 of the Albrecht patent).

BRIEF SUMMARY OF THE INVENTION

It is an object of the present invention to provide for a turbine airfoil of the spar and shell construction with ribs that secure the shell to the spar and form a seal for adjacent cooling channels.

It is another object of the present invention to provide for a turbine airfoil of the spar and shell construction with ribs that prevent bulging of the shell from the spar due to high pressure cooling air.

It is another object of the present invention to provide for a turbine airfoil of the spar and shell construction with ribs that allow for thermal growth between the shell and the spar to prevent damage due to high thermal stress loads.

It is another object of the present invention to provide for a turbine airfoil of the spar and shell construction with retaining struts that can be easily inserted into the spar and the shell slid over the spar and struts.

These objectives and more can be achieved by the hook struts used to secure the shell to the spar that will provide a seal between adjacent cooling channels formed by the shell and spar walls, to prevent bulging of the shell from the spar due to high pressure cooling air, and to allow for thermal growth between the shell and the spar due to exposure to the high temperatures. The hook struts have a cross sectional shape with one end being rounded to pivot within a rounded channel on the shell and an opposite end having a hook shape that allows the hook end to be pivoted into place within a channel on the spar. All of the hook struts are inserted into the channels of the spar and then aligned with channels in the shell so that the shell can be slid in place onto the spar. The hook struts and the channels that receive the struts extend along the airfoil length in the spanwise direction and are spaced around the shell surface to form multiple cooling channels.

BRIEF DESCRIPTION OF THE SEVERAL VIEWS OF THE DRAWINGS

FIG. 1 shows a cross section view along the airfoil spanwise direction with the shell secured to the spar by a number of hook struts.

FIG. 2 shows a detailed view of a close up of a section of the airfoil of FIG. 2 with the hook strut connection.

DETAILED DESCRIPTION OF THE INVENTION

The present invention is an air cooled turbine airfoil that can be a rotor blade or a stator vane, and in which the airfoil has a shell and spar construction. The shell is a thin walled shell to provide for relatively low metal temperature due to backside convection and impingement cooling, the shell being secured to the spar by a number of hook struts that prevent bulging of the shell due to high cooling air pressure between the spar and the shell, to produce a seal between adjacent cooling channels formed between the shell and the spar, and to allow for thermal growth (in both the spanwise and chordwise directions of the airfoil) of the shell with respect to the spar due to temperature differences.

FIG. 1 shows a cross section of the turbine airfoil with the shell 21 having a thin wall construction and forming the airfoil surface with a leading edge and a trailing edge and a pressure side wall and suction side wall extending between the two edges. The shell is made from an exotic high temperature material such as tungsten or molybdenum or columbium using an electronic discharge machining (EDM) process such as wire EDM. The spar 22 has a similar shaped airfoil cross sectional shape to follow the inner surface of the shell, and defines a number of separated cooling air supply channels 23 in which cooling air can be supplied to the airfoil assembly. An inner surface of the shell 21 has a number of raised sections 24 each with a circular opening 25 that forms the support surfaces for the rounded end 36 of hook strut 13. The raised sections 24 have the circular openings 25 on an inner end with a narrow gap or openings on the outer end (as seen in FIG. 2) to prevent the hook strut 10 from pulling out from the circular opening 25.

The hook struts 13 used in the present invention include a rounded end 36 and a hook end 35 as seen in the detailed view of FIG. 2. The hook struts 13 are as long as the channels formed within the spar 22 and the shell 21. The hook end 35 extends substantially perpendicular to a central axis of the rounded end 36 and the middle section of the hook strut 13. The hook struts 13 can be formed from a castable metallic materials such as the nickel super alloys used in the prior art turbine rotor blades. The hook struts 13 can be formed from a high temperature metallic material that can be extruded to form the strut.

The spar 22 includes a number of hook shaped channels 31 in which the hook shaped end 35 of the hook strut 13 fits within to retain the shell 21 to the spar 22. The spar channel 31 includes one side that opens to allow for the hook strut 13 to be inserted from the side direction and an overhanging section 32 that forms an abutment surface to prevent the hook strut 13 from being pulled out from the spar channel 31. FIG. 2 shows a detailed view of one of the hook struts 13 mounted within the channels of the spar and the shell. The rounded channel 25 and the hook shape channel 31 extend substantially along an entire airfoil spanwise direction.

The hook struts 13 not only hold the shell 21 to the spar 22 to prevent bulging of the shell 21 from the spar 22, but form a seal between adjacent cooling channels 26 formed between the shell 21 and the spar 22. Pressurized cooling air is supplied to the airfoil to provide convection cooling for the inner or backside surface of the shell 21 and even impingement cooling if designed into the airfoil. The pressure of the cooling air within one cooling channel 26 may be at a different temperature than an adjacent cooling channel due to a backflow margin requirement if film cooling holes are used in the shell. Thus the need for the sealing capability. The hook struts 13 prevent the shell wall from bulging away from the spar 22 due to the high pressure of the cooling air within the cooling channel 26 and provide a seal.

In another embodiment of the spar and shell airfoil, the spar 22 can include impingement cooling holes to direct impingement cooling air from the central cooling supply channel 23 toward the backside surface of the shell 21 and then channel the spent cooling air to film cooling holes or blade tip cooling holes for discharging the spent impingement cooling air from the airfoil. Also, the cooling channels 26 formed between the shell 21 and the spar 22 can be connected in series to produce a serpentine flow cooling circuit for near wall cooling of the shell. The cooling air can then be discharged out to a trailing edge cooling channel and through a row of trailing edge exit holes to be discharged from the airfoil.

To assemble the composite airfoil, the hook struts 13 are placed into the channels of the spar by inserting the hook end into the spar channel 31 and pivoting the hook strut 13 into place. With all of the hook struts 13 inserted into the spar channels 31, the shell 21 is then slid over the spar with the rounded ends of the hook struts aligned with the rounded openings of the shell channels 25 so that the entire hook struts can be slid into place within the shell channels 25. In the present invention, the shell 21 is formed from an exotic high temperature metallic material such as tungsten, molybdenum or columbium using an electric discharging machining process such as wire EDM to form a thin wall shell with the raised sections 24 having the circular openings 25 formed by the wire EDM process as a single piece shell. The spar 22 can be formed from well known prior art materials and processes such as from nickel super-alloys using the investment casting process since the operating temperature of the spar 22 with adequate cooling will be within an acceptable range.

I claim:

1. An air cooled turbine airfoil comprising:
   a shell having an airfoil shape with a leading edge, a trailing edge, and a pressure side wall and a suction side wall extending between the leading edge and the trailing edge;
   a spar forming an internal cooling air supply channel;
   a plurality of rounded channels on an inner surface of the shell;
   a plurality of hook shaped channels on an outer surface of the spar;
   the shell channels and the spar channels being opposed to one another;
   a hook shaped strut having a rounded end and a hook end;
   a rounded end of the hook shaped strut being inserted into the rounded channel of the shell; and,
   the hook shaped end of the hook shaped strut being inserted into a hook shaped channel of the spar to retain the shell to the spar.

2. The air cooled turbine airfoil of claim 1, and further comprising:
   the hook shaped strut forms a seal being adjacent cooling air channels formed between the spar and the shell.

3. The air cooled turbine airfoil of claim 1, and further comprising:
   the rounded end of the hook shaped strut and the rounded channel on the shell allow for the hook shaped strut to pivot within the shell channel without being pulled out from the shell channel.

4. The air cooled turbine airfoil of claim 1, and further comprising:
   the hook shaped struts are formed from a high temperature metallic material that can be extruded to form the hook shaped struts.

5. The air cooled turbine airfoil of claim 1, and further comprising:
   the shell is formed from one of tungsten, molybdenum and columbium.

6. The air cooled turbine airfoil of claim 5, and further comprising:
   the shell is a thin walled shell.

7. The air cooled turbine airfoil of claim 1, and further comprising:
   the airfoil is a rotor blade for use in an industrial gas turbine engine.

8. The air cooled turbine airfoil of claim 1, and further comprising:
   the airfoil is a stator vane for use in an industrial gas turbine engine.

9. The air cooled turbine airfoil of claim 1, and further comprising:
   the rounded channel and the hook shaped channel extend substantially along an entire airfoil spanwise direction.

10. The air cooled turbine airfoil of claim 1, and further comprising:
    the hook end extends substantially perpendicular to a central axis passing through the rounded end and a middle section of the hook shaped strut.

* * * * *